United States Patent [19]
Pitkow et al.

[11] Patent Number: 6,038,574
[45] Date of Patent: Mar. 14, 2000

[54] METHOD AND APPARATUS FOR CLUSTERING A COLLECTION OF LINKED DOCUMENTS USING CO-CITATION ANALYSIS

[75] Inventors: James E. Pitkow, Palo Alto; Peter L. Pirolli, San Francisco; Jock D. Mackinlay, Palo Alto; Stuart K. Card, Los Altos Hills, all of Calif.

[73] Assignee: Xerox Corporation, Stamford, Conn.

[21] Appl. No.: 09/044,693

[22] Filed: Mar. 18, 1998

[51] Int. Cl.$^7$ .................................................. G06F 17/21
[52] U.S. Cl. .......................................... 707/513; 707/102
[58] Field of Search .................................. 707/513, 514, 707/907, 901, 100, 102

[56] References Cited

U.S. PATENT DOCUMENTS

| | | | |
|---|---|---|---|
| 5,568,640 | 10/1996 | Nishiyama et al. | 707/1 |
| 5,594,897 | 1/1997 | Goffman | 707/102 |
| 5,675,819 | 10/1997 | Schuetze | 704/10 |
| 5,717,922 | 2/1998 | Hohensee et al. | 707/100 |
| 5,819,258 | 10/1998 | Vaithyanathan et al. | 707/2 |
| 5,870,552 | 2/1999 | Dozier et al. | 709/219 |
| 5,895,470 | 4/1999 | Pirolli et al. | 707/102 |
| 5,920,859 | 7/1999 | Li | 707/5 |

OTHER PUBLICATIONS

Botafogo et al., "Structural Analysis of Hypertexts: Identifying Hierarchies and Useful Metrics", ACM Transactions on Information Systems, Vol. 10, No. 2, Apr. 1992, pps. 142–180.

Griffith et al., "The Structure of Scientific Literatures II: Toward a macro–and Miicrostructure for Science", Science Studies, 4 (1974), pps. 339–365.

Larson, R.R., "Bibliometrics of the World Wide Web: An Exploratory Analysis of the Intellectual Structure of Cyberspace", Proceedings of the 1996 American Society for Information Science Annual Meeting, pp. 1–13.

Small, H., "Co–citation in the Scientific Literature: A New Measure of the Relationship Between Two Documents", Journal of the American Society for Information Science, Jul.–Aug. 1973, pp. 265–269.

*Primary Examiner*—Jean R. Homere
*Attorney, Agent, or Firm*—Richard B. Dominko

[57] ABSTRACT

The method and apparatus of the present invention generates clusters of documents in a collection of linked documents based on co-citation analysis. The frequency linkage is determined for each document in the collection. In other words, the number of times each document is linked to by another document in the collection is determined. Further, a minimum frequency linkage (link frequency threshold) is specified based on a predetermined minimum frequency of document linkage. Additionally, a list of pairs of documents that are linked to by the same document is created so that each of the pairs of documents has a count of the number of times (co-citation frequency) that they are both linked to by another document. Pairs of linked documents are clustered using a suitable co-citation technique.

15 Claims, 7 Drawing Sheets

| LIST | CLUSTER 1 | CLUSTER 2 |
|---|---|---|
| 610 | 620 | 630 |
| 605->(X,Y) | 600->(C,D) | 604->(Z,W) |
| 606->(X,W) | 601->(A,D) | |
| 607->(Y,W) | 603->(B,D) | |
| | 602->(A,B) | |

FIG. 6D

| LIST | CLUSTER 1 | CLUSTER 2 |
|---|---|---|
| 610 | 620 | 630 |
| 605->(X,Y) | 600->(C,D) | 604->(Z,W) |
| | 601->(A,D) | 606->(X,W) |
| | 603->(B,D) | 607->(Y,W) |
| | 602->(A,B) | |

FIG. 6E

| CLUSTER 1 | CLUSTER 2 |
|---|---|
| 620 | 630 |
| 600->(C,D) | 604->(Z,W) |
| 601->(A,D) | 606->(X,W) |
| 603->(B,D) | 607->(Y,W) |
| 602->(A,B) | 605->(X,Y) |

METHOD AND APPARATUS FOR CLUSTERING A COLLECTION OF LINKED DOCUMENTS USING CO-CITATION ANALYSIS

FIELD OF THE INVENTION

The present invention is related to the field of analysis of linked collections of documents, and in particular to the clustering of documents in the linked collection having similar content.

BACKGROUND OF THE INVENTION

The ever-increasing universe of electronic information, for example as found on the World Wide Web (herein after referred to as the Web), competes for the effectively fixed and limited attention of people. Both consumers and producers of information want to understand what kinds of information are available, how desirable it is, and how its content and use change through time.

Making sense of very large collections of linked documents and foraging for information in such environments is difficult without specialized aids. Collections of linked documents are often connected together using hypertext links. The basic structure of linked hypertext is designed to promote the process of browsing from one document to another along hypertext links, which is unfortunately very slow and inefficient when hypertext collections become very large and heterogeneous. Two sorts of aids have evolved in such situations. The first are structures or tools that abstract and cluster information in some form of classification system. Examples of such would be library card catalogs and the Yahoo! Web site (URL http://www.yahoo.com). The second are systems that attempt to predict the information relevant to a user's needs and to order the presentation of information accordingly. Examples would include search engines such as Lycos (URL: http://www.lycos.com), which take a user's specifications of an information need, in the form of words and phrases, and return ranked lists of documents that are predicted to be relevant to the user's need.

Another system which provides aids in searching for information on the Web is the "Recommend" feature provided on the Alexa Internet Web site (URL: http://www.alexa.com). The "Recommend" feature provides a list of related Web pages that a user may want to retrieve and view based on the Web page that they are currently viewing.

It has been determined that one way to facilitate information seeking is through automatic categorization of Web Pages. One technique for categorization of Web pages is described by P. Pirolli, J. Pitkow and R. Rao in the publication entitled *Silk from a Sow's Ear: Extracting Usable Structures from the Web,* Conference on Human Factors in Computing Systems (CHI 96), Vancouver British Columbia, Canada, April 1996. Described therein is a categorization technique wherein each Web page is represented as a feature vector, with features extracted from information about text-content similarity, hypertext connections, and usage patterns. Web pages belonging to the same category, may then be clustered together. Categorization is computed based on inter-document similarities among these feature vectors.

Another aid for making sense of such collections is clustering. One way to approach the automatic clustering of linked documents is to adapt the existing approaches of clustering standard text documents. Such an approach is described by Cutting et al., in the publication entitled "Scatter/gather: A cluster based approach to browsing large document Collections", The 15th Annual International ACM SIGIR Conference on Research and Development in Information Retrieval, pages 318–329, August 1992. However, there are several impracticalities with such existing text-clustering techniques. Text-based clustering typically involves computing inter-document similarities based on content-word frequency statistics. Not only is this often expensive, but, more importantly, its effectiveness was developed and tuned on human-readable texts. It appears, though, that the proportion of human-readable source files for Web pages is decreasing with the infusion of dynamic and programmed pages.

Another option for performing clustering of document collections is to look at usage patterns. Unfortunately, any clustering based on usage patterns requires access to data that is not usually recorded in any easily accessible format. In the case of the Web, while a moderate amount of usage information is recorded for each requested document at a particular Web site, the log files for other sites are not publicly accessible. Thus while the usage for a particular site can be ascertained, this information is not available for the other 500,000 Web sites that currently exist.

Other attempts at clustering hypertext typically utilize the hypertext link topology of the collection. Such techniques are described by R. A. Botafogo, E. Rivlin, and B. Schneiderman, *Structural Analysis of Hypertexts: Identifying Hierarchies And Useful Metrics,* ACM Transactions on Information Systems, 10(2):142–180, 1992. Such a basis for clustering makes intuitive sense since the links of a particular document represent what the author felt was of interest to the reader of the document. These known clustering methods have been applied to collections with several hundred elements, and do not seem particularly suited to scale gracefully to large heterogeneous collections like the Web, where it has been estimated that there are over 70 million text-based documents which currently exist.

Other publications relevant to the invention of the present application:

Larson, Ray R., *Bibliometrics of the World Wide Web: An Exploratory Analysis of the Intellectual Structure of Cyberspace,* Proceedings of 59th ASIS Annual Meeting held in Baltimore Md., edited by Steve Hardin, Vol. 33:71–78, Information Today Inc., 1996.

SUMMARY OF THE INVENTION

A method and apparatus for clustering collections of linked documents is disclosed. Clustering of documents is a technique used to identify related subsets of documents and has been found to be useful when searching large collections of documents. The present invention is premised on the idea that the documents to which a particular document links have some degree of commonality. This idea and related analysis techniques are referred to herein as co-citation analysis.

The method of the present invention is generally comprised of the steps of: generating a document collection; for each document, determine the frequency of linkage, i.e. the number of times it is linked to by another document in the collection, threshold the documents based on some minimum frequency of linkage, create a list of pairs of documents that are linked to by the same document so that each of the pairs of documents has a count of the number of times (the co-citation frequency) that they were both linked to by another document, and cluster pairs using a suitable co-citation clustering technique.

DETAILED DESCRIPTION OF THE INVENTION

A system for analyzing collections of linked documents for the purpose of clustering is disclosed. The information derived from such a system may be used to aid a user in browsing the collection, redesigning the organization of the collection, fed into other computations useful in analysis of collections of linked documents (e.g. spreading activation), or in creating visualizations of the collections.

The currently preferred embodiment of the present invention is implemented for analyzing collections of linked documents (i.e. Web Pages) residing on the portion of the Internet known as the World Wide Web (hereinafter the Web). The Web is the portion of the Internet that is used to store and access linked documents. A Web page may have multi-media content as well as relative and absolute links to other pages. A Web Site is a collection of related Web pages associated with an entity having a presence on the World Wide Web such as a company, educational institute or the like.

In this description, the term Web page is an instance of a linked document and the two terms may be used interchangeably. Moreover, it should be noted that the present invention is not limited to use on the Web and may be utilized in any system which provides access to linked entities, including documents, images, videos, audio, etc.

It has been observed that a collection of Web pages has a topology that is defined by links contained in the individual Web pages. Links are an indicator on a Web page which refers to another Web page and which can typically be retrieved in a point and click fashion. The link will specify the address, i.e. Uniform Resource Locator or URL, of the other Web page.

Figure 1:
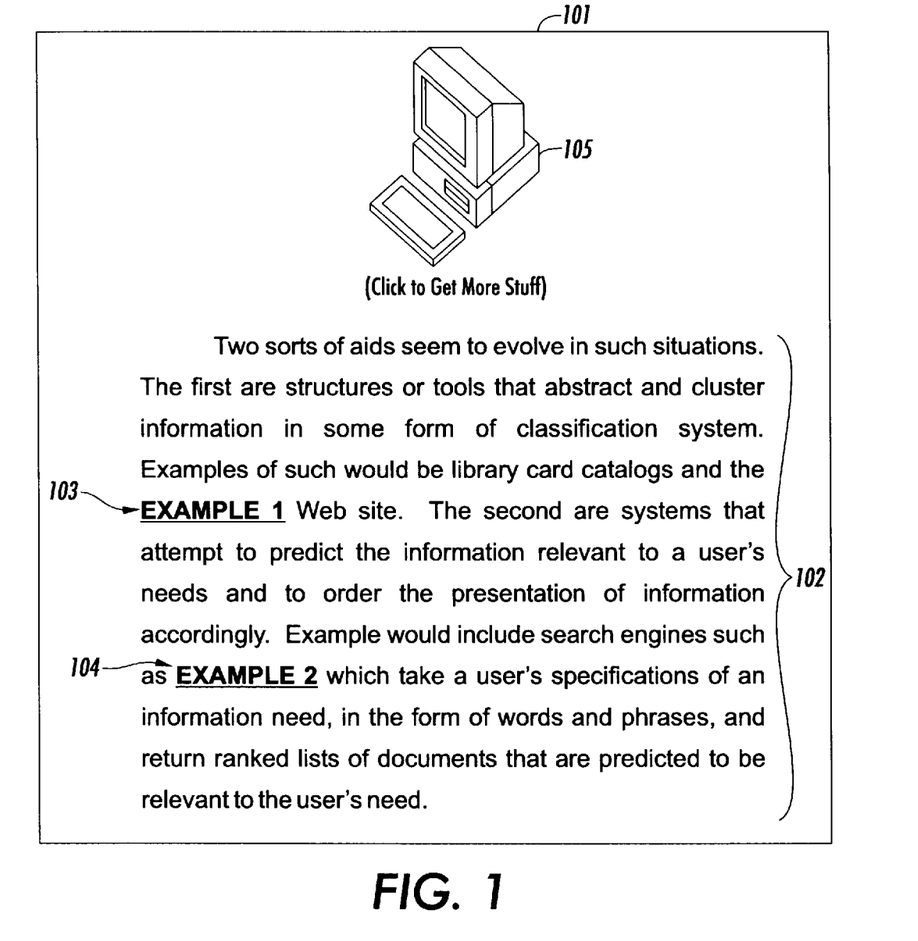
FIG. 1 is a block diagram illustrating the underlying structure of a Web Page.

FIG. 1 is a block diagram illustrating the underlying structure of a Web page. As would be known by one of ordinary skill in the art, such a Web page would be typically specified in a mark-up language such as the Hyper-text Mark-Up Language (HTML) or the Extensible Mark-Up Language (XML) and which would be viewable via a Web Browser. A Web Browser is a tool which enables a user to traverse through and view documents residing on the Web. Other rendering means associated with the Browser will permit listening to audio portions of a document or viewing video or image portions of a document. Examples of commercially available Web Browsers include Netscape Navigator™, available from Netscape Communications Corporation, and Internet Explorer™, available from the Microsoft Corporation.

In any event, the Web Page 101 has text content part 102 and links 103105. The text content part 102 is merely the standard text of a document. The links 103–105 may be represented on a rendered page as either text (e.g. links 103–104) or image (e.g. link 105). As illustrated in FIG. 1, when the link is represented as text, it is visually distinct from ordinary text. In FIG. 1 the links 103 and 104 are underlined.

Making sense of the millions of web pages available on the Web is a daunting and difficult task. As a way of circumventing these difficulties, in the currently preferred embodiment of the present invention, co-citation analysis has been utilized as a way to cluster groups of web pages. The adaptation of this clustering technique is based solely on the analysis of hypertext link topology of a collection of Web pages. Unlike earlier link-topology techniques, co-citation analysis builds upon the notion that when a Web page D contains links referring to documents A and B, then A and B are related in some manner in the mind of the person who produced the document. In this example, documents A and B are said to be co-cited. It is important to note that links between document A and document B may or may not exist. Given this property of picking up patterns from the implicit topological structure of hypertext documents, it has been determined that co-citation analysis is useful in telling us something about the semantic structure of a collection and the thinking of the authoring community.

Overview of Co-Citation Analysis

Citation indexing, the creation of an index that details the explicit linkages of citations between papers, has been employed as a tool to facilitate the searching and the management of information for over a century, dating back to the legal profession's use of the Shepard's Citations in 1873. The field underwent major advances during the post World War II increase in scientific expenditures and subsequent explosive increase in the scientific literature. With the intent of ensuring information exchange among scientists, the United States government initiated a number of projects to generate indexes without human involvement. Citation indexing was found to be a powerful yet simple tool, as it replaces an indexer's subjective judgements with author's citations, thus avoiding many of the semantic problems found in term and title based analyses. See the publication E. Garfield. *Citation Indexing*. ISI Press, Philadelphia, Pa., 1979 for more information.

It was not until the mid-1970s however that Small and Griffith described a co-citation analysis as a method for measuring the common intellectual interest between a pair of documents. See H. Small and B. Griffith. *The structure of scientific literatures, Identifying and graphing specialties,* Science Studies, 4(17):17–40, 1974. The principal component of co-citation analysis measures the number of documents that have cited a given pair of documents together. This metric is referred to as co-citation strength. Unlike other forms of citation analysis, co-citation strength is able to reflect the frequency of items being cited over time, thus enabling deeper insight into the development of certain research fields and other semantic structures within a citation index. Similarly, it has been determined that co-citation analysis yields insight into the implicit semantic structures of the Web.

The original method developed by Small and Griffith takes a citation index as initial input. Recall that a citation index is an index that details the explicit linkages of citations between papers. For all documents in the index, the number of times a document was cited is computed and those documents whose cited frequency falls above a specific threshold are kept for further processing. This prefiltering retains the most important (or at least the most popular) documents. Next, the extracted documents are sorted and all pairs of documents that have been cited together by the same source document are formed. The resulting list contains unique co-citation pairs and their associated frequency of co-occurrence.

The final step in co-citation analysis creates a set of clusters whose elements are indirectly or directly related by co-citation. This is accomplished by clustering all documents that have at least one document of the co-citation pair in common with the other elements in the cluster. To start, a pair is selected, say AB, and all pairs that contain A or B are added to the cluster. Next, all pairs that include a document that have been included in the cluster are added. This processes repeats until there are no pairs that have a document in common with the elements in the cluster. At this point, a new pair is selected from the remaining pairs to form a new cluster and the processes repeated until all pairs belong to a cluster. This clustering technique is referred to herein as the All-Pairs method.

Application to the Web

It has been observed that the properties that fueled the development of citation and co-citation analysis are similar to those found between documents on the Web. The links found in Web pages, when employed in a non-random format, provide semantic linkages between objects, much in the same manner that citations link documents to other related documents. The resulting topology of a Web site reflects the organization of a community and its knowledge base, similar to the way in which citations in a scholarly paper reflect a scientific community's organization of knowledge.

It could be argued that links often serve as just navigational aids. This may be true for example for many of the links found on a "home page" for a particular Web locality. However, the role of hyperlinks for navigation may still be viewed as a hypothesis by the hypertext author(s) that the person interested in the current page will also be interested in browsing the linked pages. It has been determined that given the close resemblance of hyperlinks to citations, meaningful structures would emerge as the result of co-citation analysis on Web site.

An example of application of co-citation analysis as applied to the Web is found in a publication by Larson, Ray R., *Bibliometrics of the World Wide Web: An Exploratory Analysis of the Intellectual Structure of Cyberspace,* Proceedings of 59$^{th}$ ASIS Annual Meeting held in Baltimore Md., Vol. 33:71–78, Information Today Inc., 1996. In the publication Larson uses co-citation analysis to examine the "bibliometrics" of the Web so as to map its contents.

Generally speaking, the clustering of Web pages is useful in that it aids in the sense-making of large document collections, i.e. understanding its content and the relationship amongst the various documents. Further, clustering may be used as a real time aid in searching document collections using scatter-gather techniques. The clustering of the present invention may be used in any of these settings.

Method For Clustering Web Pages

Figure 2:
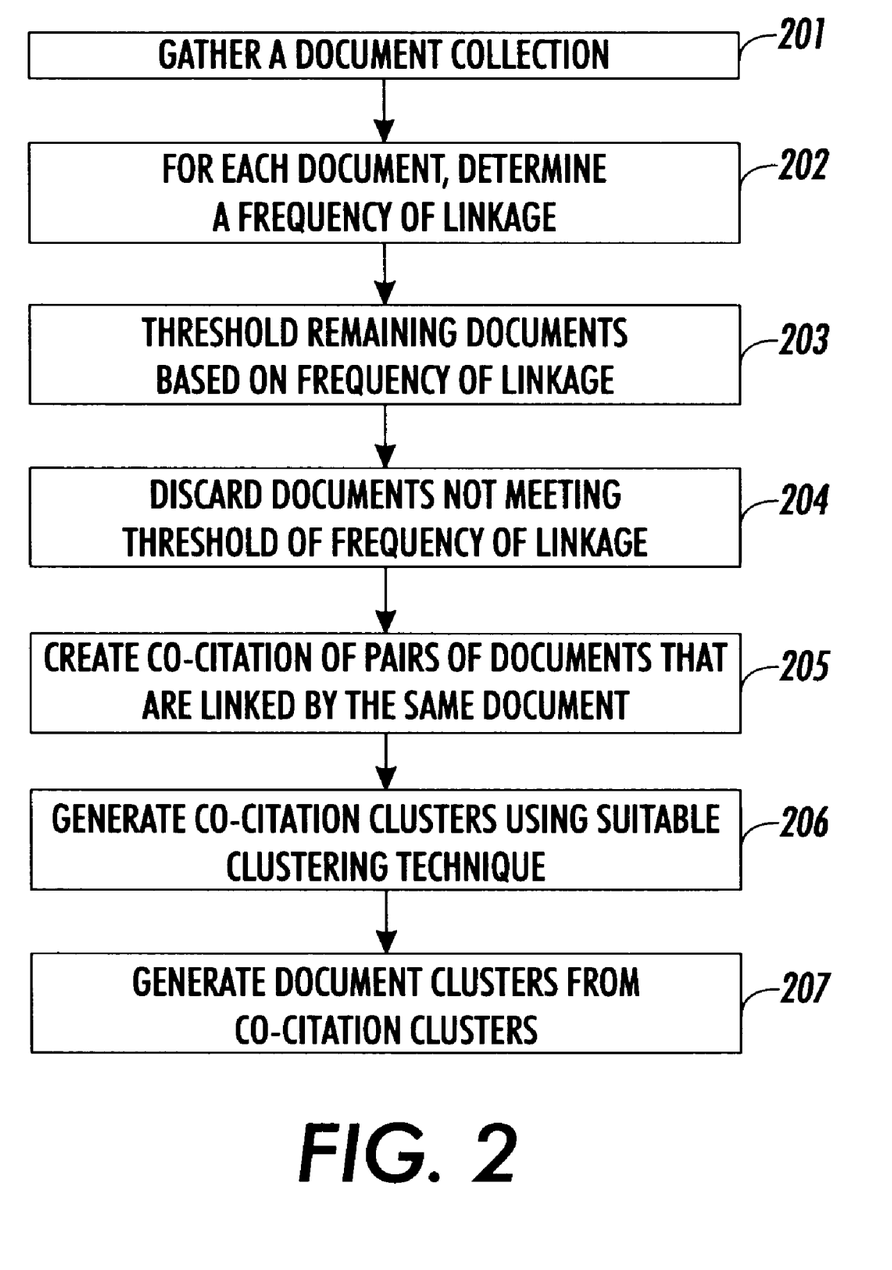
FIG. 2 is a flowchart illustrating the basic steps for the co-citation analysis and resulting clustering as may be performed in the currently preferred embodiment of the present invention.

The currently preferred embodiment of the present invention is implemented using software programs which inspect the mark-up language (e.g. HTML) representations of the documents. As would be known by one of ordinary skill in the art, links are identified by specific "tags" placed before them as defined by the mark-up language. Identification of links is thus accomplished by looking for the specific tags. In any event, the first step is to gather a document collection, step 201. This may be done by a specific query to the Web, using a document retrieval system such as LycoS™, Excite™, etc. or using a Web walker which automatically follows the links on a document and collects the linked documents. Or, the document collection could be some randomly selected collection of documents. Or the document collection could be a particular Web site or set of Web sites or even the entire Web itself. Next, for each document, determine the frequency of linkage, i.e. the number of times it is linked to by another document in the collection, step 202. This may be accomplished by maintaining a table data structure having a document identifier field and link count field which is updated upon occurrence of a link to that document. This is done to get a relative sense of the "relatedness" of a document in the context of the particular document collection. Next, the documents are thresholded based on some specified minimum frequency of linkage, step 203 and the unused documents are discarded, step 204. This is essentially done as a matter of computational efficiency as documents below some minimum threshold are deemed "unrelated" to the other documents in the document collection. It should be noted that this threshold value should be established so as not to preclude relevant "young" documents that may not have many links to it at the time of analysis. A good threshold value yields the right number of clusters at the right size. It has been determined that a threshold value that is set too high causes a few clusters with a large number of documents and with many clusters with a small number of documents. If the threshold value is set too low, the result is fewer clusters with fewer documents in each. Note that preferably the threshold value can be changed by a user until the desired cluster characteristics are achieved.

Next, a co-citation list of pairs of documents that are linked to by the same document is created, step 205. Each of the pairs of documents will also have a count of the number of times (the co-citation frequency) that they were both linked to by another document. The co-citation list may typically be generated and comprised of a table data structure having a first field identifying a co-citation pair and a second field having a count of the number of times that the co-citation pair were linked to by the same document.

A suitable clustering operation is then performed on the co-citation list to generate co-citation clusters, step 206. Such suitable clustering operations are described in more detail below. The individual documents are then identified from the co-citation clusters and provided as a document cluster, step 207. This is performed since each document is typically referenced in multiple of the co-citation pairs.

A first type of clustering utilizes a technique known as transitive closure. Transitive closure is generally related to identification of self-contained sets of node link structures, i.e. no node (document) has a link to another node (document) outside of the set. The clustering techniques using transitive closure can be generally described as follows:

Given S=the set of all documents; V=the links contained in each document; G=<S,V>=the graph of nodes S and links V Step 1: Let Result={ }
Step 2: Pick a node i in S
Step 3: Find the transitive closure of i in G→C(i)
Step 4: Reset S←S−C(i) and Add C(I) to Result Set
Step 5: Loop Steps 2–4 until S={ }
Step 6: Return Result Set The step 3 may be accomplished using a transitive closure technique such as the well known Floyd-Warshall technique.

Figure 3:
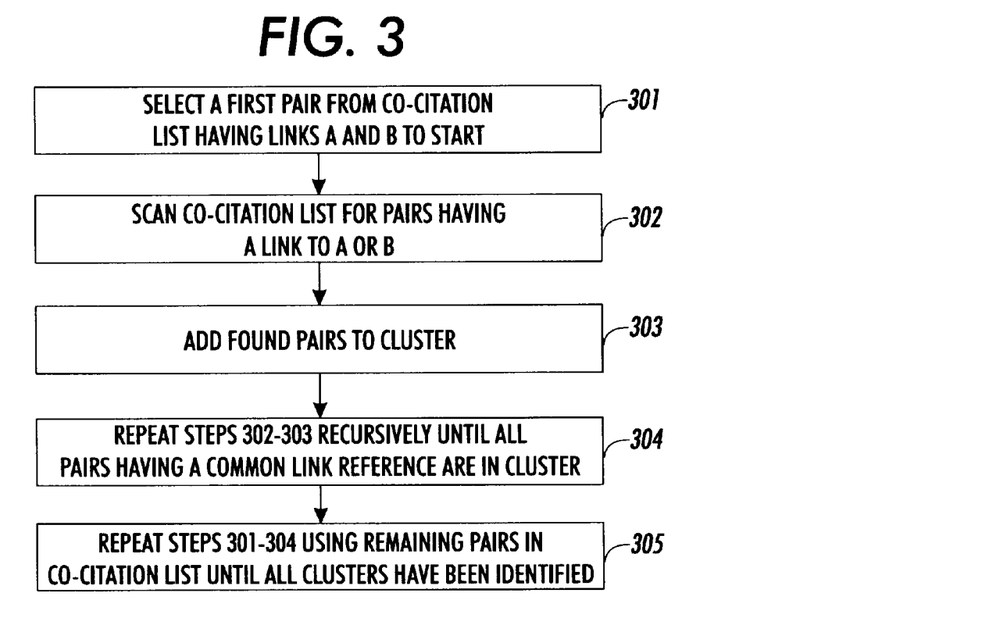
FIG. 3 is a flowchart illustrating the steps for performing an "all pair" clustering of a list of co-cited Web pages as may be performed in the currently preferred embodiment of the present invention.

A transitive closure clustering method, referred to as the all-pairs method is described with reference to the flowchart of FIG. 3. The objective of the all-pairs method is to place in a cluster all pairs having at least one common link. Referring to FIG. 3, a first pair having a first page link reference (A) and a second page link reference (B) is selected, step 301. This represents a first cluster. Next, the list is scanned to find all pairs having a link reference to A or a link reference to B, step 302. Each of the pairs so identified is then identified as being in the first cluster, step 303. The steps 302–303 are repeated recursively for each of the co-citation pairs in the cluster until all pairs having a common link reference are included in the first cluster, step 304. The steps 301–304 are then repeated using the remaining pairs of the original co-citation list until all clusters have been identified, step 305. The "all-pairs" method of clustering is described in greater detail below with respect to FIG. 6.

Figure 4:
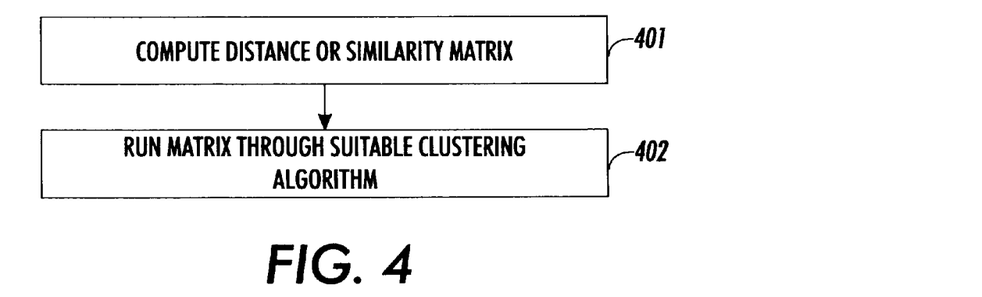
FIG. 4 is a flowchart illustrating the steps for performing a statistical clustering of a list of co-cited Web pages as may be performed in the currently preferred embodiment of the present invention.

An alternative technique may use some form of statistical clustering. Such statistical clustering is generally described in the flowchart of FIG. 4. Referring to FIG. 4, first a distance or similarity matrix is computed, step 401. In the currently preferred embodiment, the Euclidean distance matrix on the log transformed co-citation frequencies is computed. However, other known methods that may be utilized include Manhattan, maximum, and binary distance metrics. One may also compute the correlation coefficients for each cell. In any event, the matrix is run through a suitable clustering algorithm, step 402. In the currently preferred embodiment, the Euclidean distance matrix is run through complete linkage clustering method to obtain clustering. However, other forms of clustering may be utilized.

It should be noted that clustering techniques usually fall into one of two categories: hierarchical techniques (in particular agglomerative and divisive) and partitioning techniques. Agglomerative methods start with each element in a single cluster and successively merges the closest pairs. Common forms of this are Ward's clustering and hierarchical clustering. Divisive methods start with all the elements as one cluster and splits until each element is in a separate cluster. Two common form of this are diana and mona. Partitioning methods divide the elements into a pre-defined number of clusters. A common form of this is called k-means. For a description of other suitable clustering techniques see the text entitled Finding Groups in Data An Introduction to Cluster Analysis, Leonard Kaufman, Peter J. Rousseeuw, published by John Wiley & Sons, New York, 1990.

Figure 5:
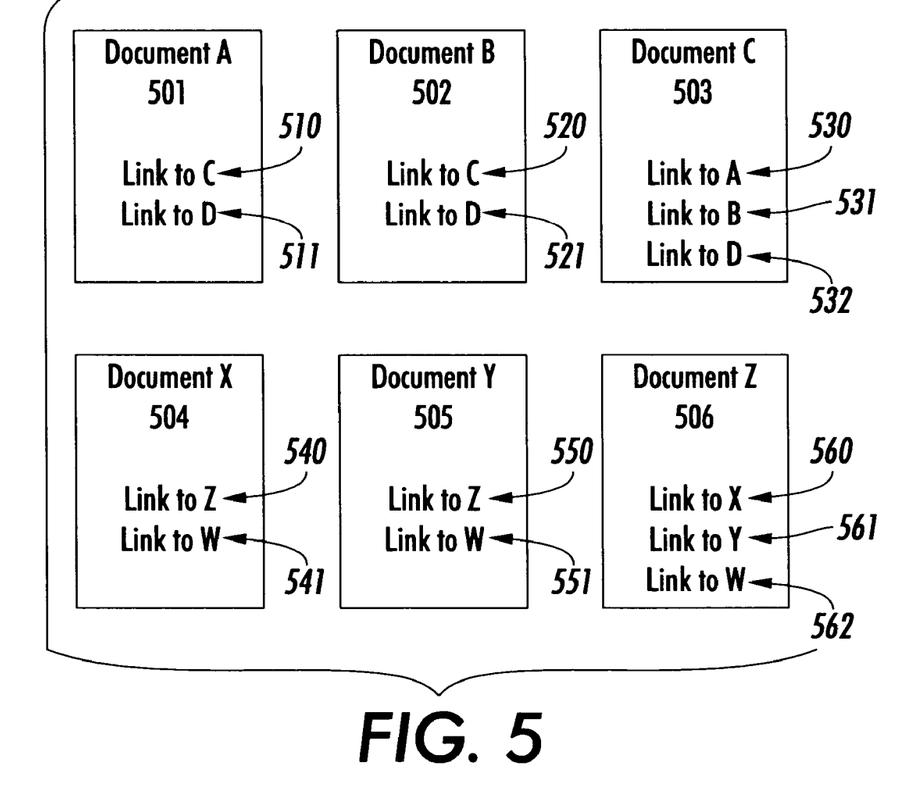
FIG. 5 is a diagrammatic representation of a plurality of documents and their links used for the purpose of describing an example of the co-citation analysis of the currently preferred embodiment of the present invention.

Example of the Co-citation Analysis and Clustering of the Currently Preferred Embodiment What follows is an example that illustrates the co-citation analysis of the present invention. It is assumed that each of the documents has met the threshold requirement of being "linked" to a minimum number of times. FIG. 5 illustrates a plurality of documents 501–506 having defined links. As illustrated document A 501 has links 510–511, document B 502 has links 520–521, document C 503 has links 530–532, the document X 504 has links 540–541, document Y 505 has links 550–551 and document Z 506 has links 560–562. It can then be seen that the co-citation pairs from the respective documents are:

document A 501: (C,D)
document B 502: (C,D)
document C 503: (A,B), (A,D), (B,D)
document X 504: (Z,W)
document Y F 505: (Z,W)
document Z 506: (X,Y), (X,W), (Y,W)

The co-citation list and associated frequency then becomes: (C,D):2, (A,D): 1, (A,B): 1, (B,D): 1, (Z,W): 2, (X,Y): 1, (X,W): 1, (Y,W): 1

Figure 6A:
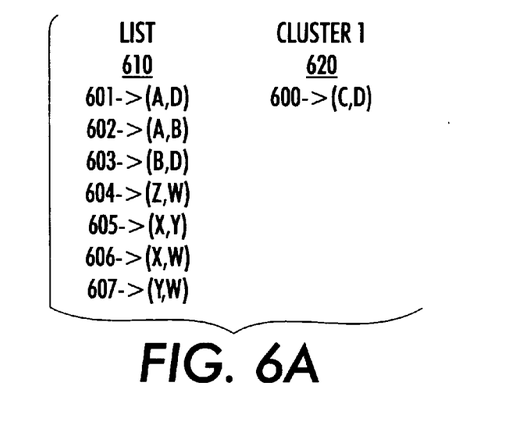
FIGS. 6a–6f is a diagrammatic representation of the list of co-cited pairs generated from FIG. 5 and are used for the purpose of describing an example of the "all-pairs" method of clustering web pages in the currently preferred embodiment of the present invention.

FIGS. 6a–6f illustrates use of the "all-pairs" method for clustering the co-citation list. Note that the co-citation method does not utilize the frequency of the co-citation. That is typically used in statistical clustering techniques. Referring to FIG. 6a, a list 610 and cluster 1 620 are illustrated. The elements 601–607 in the list 610 are the elements in the co-citation list generated with respect to the example of FIG. 5, except for the list pair 600 which is used as the randomly selected initial pairing for cluster 1 620.

Figure 6B:
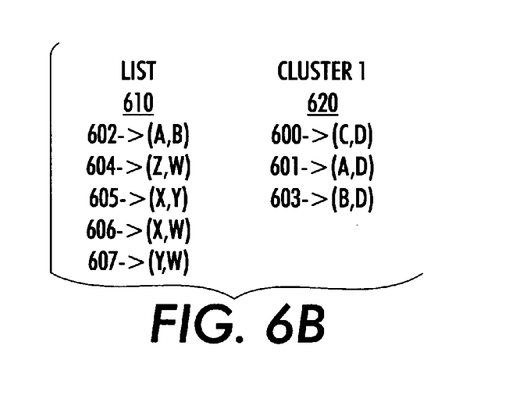

Referring to FIG. 6b, added to cluster 1 620 are the co-citation pairs from the list which have either a C or D in them. So as illustrated the pairs 601 and 603 have been added to cluster 1 and removed from the list 610.

Figure 6C:
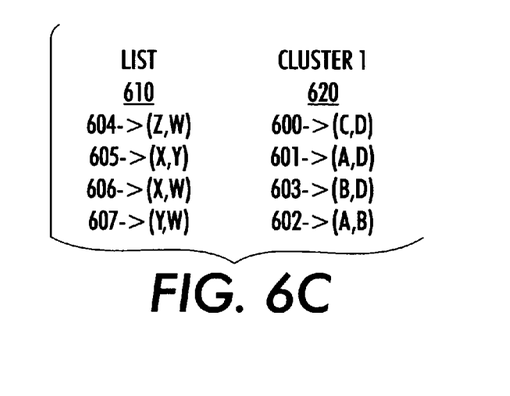

Referring now to FIG. 6c, as a result of the addition of co-citation pair 601 to cluster 1, any co-citation pair having an A is added to the cluster. This results in the co-citation pair 600 being added to cluster 1 620. Note that as a result of the addition to cluster 1 of co-citation pair 603, the list would be inspected for any pair having a B. But since no pair in the list 610 contains a B, illustration of such a step has been omitted.

Figure 6D:
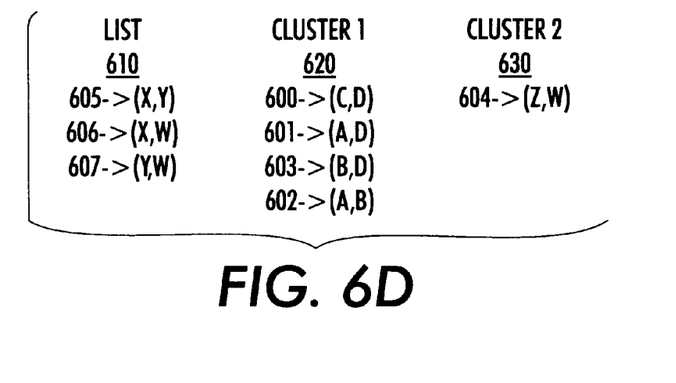
Figure 6E:
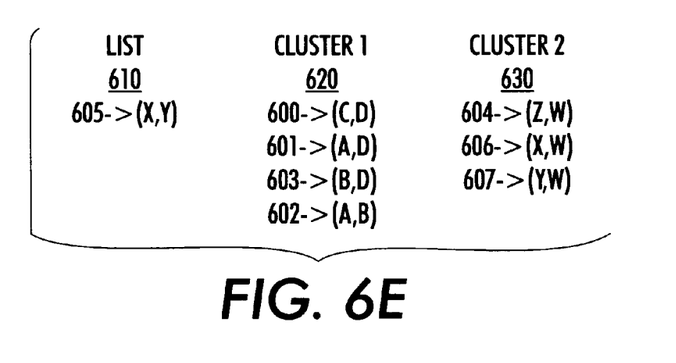
Figure 6F:
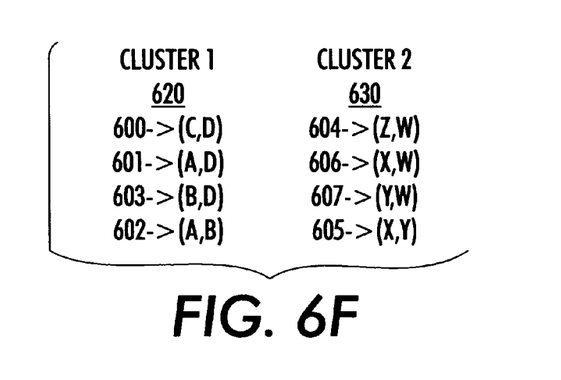

Referring now to FIG. 6d, a cluster 2 630 is now being formed. This is illustrated by addition of pair 604 to cluster 2 630. Referring now to FIG. 6e, the pairs 606 and 607 have been added to cluster 2 630 as a result of the each having a link to W. Finally, referring to FIG. 6f, the pair 605 is added to the cluster 2 630 as a result of having a link to Y.

Visualizations of Document Clusters and Collections

Most current Web browsers provide very little support for helping people gain an overall assessment of the structure and content of large collections of Web pages. Information Visualization could be used to provide an interactive overview of web localities that facilitates navigation and general assessment. Visualizations have been developed that provide new interactive mechanisms for making sense of information sets with thousands of objects. The general approach is to map properties and relations of large collections of objects onto visual, interactive structures.

The document clustering of the present invention may be used to support such Information Visualization. To the extent that the properties that help users navigate around the space and remember locations or ones that support the unit tasks of the user's work, the visualizations provide value to the user. Visualizations can be applied to the Web by treating the pages of the Web as objects with properties. Each of these visualizations provide an overview of a Web site in terms of some simple property of the pages. For example, the clustering of web pages as may be performed in the present invention may be used to create new document collections for use by other information visualization techniques, such as the WebBook described in co-pending and commonly assigned application Ser. No. 08/525,936 entitled "Display System For Displaying Lists of Linked Documents", to form and present larger aggregates of related Web pages. Other examples include a Cone Tree which shows the connectivity structure between pages and a Perspective Wall which shows time-indexed accesses of the pages. The cone tree is described in U.S. Pat. No. 5,295,243 entitled "Display of Hierarchical Three-Dimensional Structures With Rotating Substructures". The Perspective Wall is described in U.S. Pat. No. 5,339,390 entitled "Operating A Processor To Display Stretched Continuation Of A Workspace".

Figure 7:
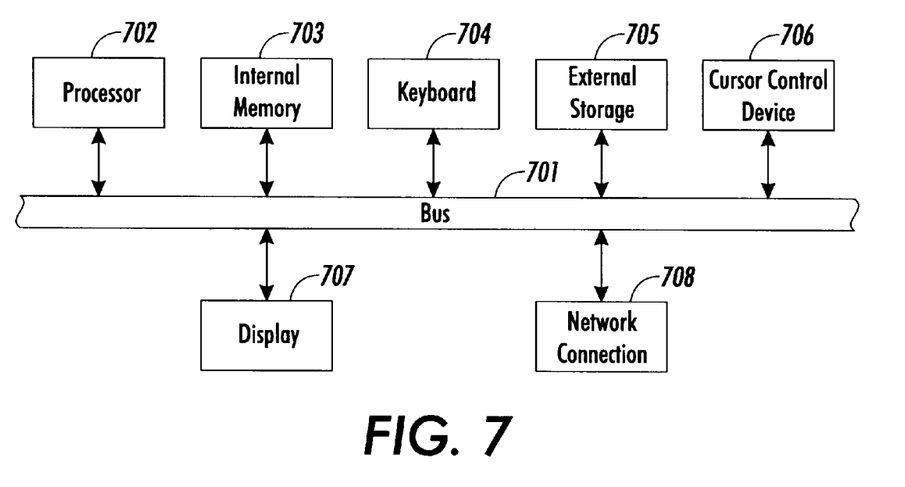
FIG. 7 is a block diagram of a computer based system upon which the currently preferred embodiment of the present invention may be implemented.

Overview of a Computer Controlled Display System In the Currently Preferred Embodiment of the Present Invention The computer based system on which the currently preferred embodiment of the present invention may be implemented is described with reference to FIG. 7. As noted above, the present invention is implemented using software programming instructions for execution on a computer based system. The computer based system and associated operating instructions (e.g. software) embody circuitry used to implement the present invention. Referring to FIG. 7, the computer based system is comprised of a plurality of components coupled via a bus 701. The bus 701 may consist of a plurality of parallel buses (e.g. address, data and status buses) as well as a hierarchy of buses (e.g. a processor bus, a local bus and an I/O bus). In any event, the computer system is further comprised of a processor 702 for executing instructions provided via bus 701 from Internal memory 703 (note that the Internal memory 703 is typically a combination of Random Access and Read Only Memories). The processor 702 will be used to perform various operations in support extracting raw data from Web site, converting the raw data into the desired feature vectors and topology, usage path and text similarity matrices, categorization and spreading activation. Instructions for performing such operations are retrieved from Internal memory 703. Such operations that would be performed by the processor 702 would include the processing steps described in the flowcharts of FIGS. 2–4 and the accompanying descriptions. The operations would typically be provided in the form of coded instructions in a suitable programming language using well-known programming techniques. The processor 702 and Internal memory 703 may be discrete components or a single integrated device such as an Application Specification Integrated Circuit (ASIC) chip.

Also coupled to the bus 701 are a keyboard 704 for entering alphanumeric input, external storage 705 for storing data, a cursor control device 706 for manipulating a cursor, a display 707 for displaying visual output and a network connection 708. The keyboard 704 would typically be a standard QWERTY keyboard but may also be telephone like keypad. The external storage 705 may be fixed or removable magnetic or optical disk drive. The cursor control device 706, e.g. a mouse or trackball, will typically have a button or switch associated with it to which the performance of certain functions can be programmed. The network connection 708 provides means for attaching to a network, e.g. a Local Area Network (LAN) card or modem card with appropriate software. The network ultimately attached to is the Internet, but it may be through proxy servers or intermediary networks or dial-up services such as America On-Line, Prodigy™ or CompuServe™.

Thus, a system for analyzing a collection of linked documents for the purposes of clustering related documents is disclosed. While the present invention is described with respect to a preferred embodiment, it would be apparent to one skilled in the art to practice the present invention with other configurations of digital document management systems. Such alternate embodiments would not cause departure from the spirit and scope of the present invention. For example, the present invention may be implemented as software instructions residing on a suitable memory medium for use in operating a computer based system.

What is claimed is:

1. A method for clustering documents contained in a collection of linked documents, said method comprising the steps of:

a) specifying a link frequency threshold, said link frequency threshold indicating a number of times a document is linked to from another document in said collection;

b) for each document in said collection, determining an associated link frequency;

c) discarding each document in said collection whose link frequency is lower than said link frequency threshold;

d) creating a co-citation list, said co-citation list comprised of pairs of documents that are linked to by the same document in said collection; and e) performing a suitable clustering operation on said co-citation list to generate document clusters.

2. The method as recited in claim 1 wherein said suitable clustering operation is a transitive closure clustering operation.

3. The method as recited in claim 1 wherein said suitable clustering operation is a statistical clustering operation.

4. The method as recited in claim 3 wherein said step of creating a co-citation list is further comprised of the step of for each pair in said co-citation list, generating a co-citation frequency indicating the number of times each pair was cited by the same document, and wherein said statistical clustering operations uses said co-citation frequency.

5. The method as recited in claim 1 wherein said method is further comprised of the steps of:

f) determining if said generated document clusters provides acceptable clustering results;

g) if said generated document clusters does not provide acceptable clustering results, varying the value of said link frequency threshold; and h) repeating steps b)–e).

6. The method as recited in claim 5 wherein an unacceptable clustering results is a combination of few large clusters and many small clusters, said step of varying the value of said link frequency threshold causes said link frequency threshold to decrease.

7. The method as recited in claim 5 wherein an unacceptable clustering result is a combination of fewer clusters with fewer documents in the clusters, said step of varying the value of said link frequency threshold causes said link frequency threshold to increase.

8. The method as recited in claim 5 wherein prior to step f) performing the step of presenting a visualization of said generated document clusters.

9. A system for clustering documents in a collection of linked documents, said system comprising means for accessing said documents in said collection of linked documents;

means for specifying a link frequency threshold;

link analysis means for analyzing the links contained in said documents in said collection of linked documents, said link analysis means further comprising:

means for determining the number of times a document has been linked to; and means for generating a co-citation list, said co-citation list indicating pairs of documents that have been linked to by the same document;

clustering means for generating document clusters from said co-citation list.

10. The system as recited in claim 9 wherein said clustering means performs a transitive closure operation.

11. The system as recited in claim 9 wherein said clustering means performs a statistical clustering operation.

12. The system as recited in claim 11 wherein said means for generating a co-citation list is further comprised of the step of generating a co-citation frequency for each pair in said list, said co-citation frequency indicating the number of times each of said pairs in said list were linked to by the same document, and said statistical clustering operation utilizes said co-citation frequency.

13. The system as recited in claim 9 further comprising cluster display visualization means for providing a visual display of said generated document clusters.

14. A program storage device readable by a machine, tangibly embodying a program of instructions executable by the machine to perform method steps for the clustering of documents in a collection of linked documents, said method steps comprising:

a) specifying a link frequency threshold, said link frequency threshold indicating a number of times a document is linked to from another document in said collection;

b) for each document in said collection, determining an associated link frequency;

c) discarding each document in said collection whose link frequency is lower than said link frequency threshold;

d) creating a co-citation list, said co-citation list comprised of pairs of documents that are linked to by the same document in said collection; and e) performing a suitable clustering operation on said co-citation list to generate document clusters.

15. The program storage device as recited in claim 14 wherein said method steps are further comprised of the steps of:

f) displaying a visualization of said document clusters;

g) determining if said generated document clusters provides acceptable clustering results;

h) if said generated document clusters does not provide acceptable clustering results, varying the value of said link frequency threshold; and i) repeating steps b)–f).

* * * * *